Patented Nov. 7, 1950

2,528,978

UNITED STATES PATENT OFFICE 2,528,978

SYNTHESIS OF PYRIDINE BASES

Curtis W. Smith, Berkeley, and Seaver A. Ballard, Orinda, Calif., assignors to Shell Development Company, San Francisco, Calif., a corporation of Delaware No Drawing. Application May 21, 1949, Serial No. 94,728

12 Claims. (Cl. 260—290)

This invention relates to the synthesis of heterocyclic organic nitrogen-containing compounds, and it more particularly relates to a process for the synthesis of nitrogen-heterocyclic organic compounds from oxygen-heterocyclic organic compounds. The invention more specifically is directed to a new and improved process for the direct synthesis of pyridine bases by reaction between ammonia and dihydropyranyl ethers in the presence of a catalyst. In a specific aspect, the invention relates to a new and improved process for the synthesis of pyridine by catalyzed vapor phase reaction between an alkoxy dihydropyran and ammonia effected at an elevated temperature in the presence of a catalyst.

It has been reported heretofore that pyridine is produced in small amounts during the formation of other nitrogen bases by reacting under suitable conditions certain oxygen-heterocyclic compounds with ammonia. Thus, it is already known that the reaction of dihydropyran with ammonia at a suitable temperature in the presence of alumina forms quantities of piperidine along with traces of pyridine. It likewise is known that piperidine, accompanied by traces of pyridine, is produced by reacting tetrahydropyran with ammonia at suitable elevated temperatures in the presence of certain catalysts. In the furan series, the reaction of tetrahydrofurfuryl alcohol with ammonia in the presence of a catalyst likewise has formed pyridine, but also along with quantities of di- and tetrahydropyridines and piperidine, as well as of tetrahydrofuryl amine. On the other hand, it also has been observed in the prior art, that neither tetrahydrofurfuryl amine nor mixtures of furfuryl alcohol and ammonia, when passed in the vapor phase over various catalysts, formed detectable amounts of pyridine.

In general, the known experiments in which there has been observed formation of pyridine from such oxygen-heterocyclic organic compounds have not provided satisfactory basis for a commercial method for the production of pyridine bases. Among the reasons for the inadequacy of the prior art processes are the low yields of the desired pyridine base or else the undesirable expense of the necessary oxygen-heterocyclic reactants. A further difficulty with the known processes has been the excessive, simultaneous formation with the desired pyridine base of undesirable amounts of other nitrogen-heterocyclic compounds, i. e., there has been in the prior art experiments a lack of specificity in the reaction as would be necessary for a commercially valuable process. In fact, reduced pyridine bases, that is, nitrogen-heterocyclic compounds which would result from partial or complete saturation with hydrogen of the pyridine ring, generally have been the principal products and only mere traces or at the most minor amounts of the pyridine base per se ordinarily have been formed in the known processes.

An object of the present invention is a new and improved process for the direct synthesis of pyridine bases, particularly pyridine, from oxygen-heterocyclic organic compounds. Another object of the invention is a process for reacting alkoxy dihydropyrans with ammonia to produce pyridine bases. A new and improved process for the direct preparation of pure pyridine by catalytic synthesis is a further object of the invention. A process for the catalytic synthesis of pyridine wherein there is avoided or precluded substantial formation of the isologous compounds having a lesser degree of unsaturation than pyridine is a further object of the invention. Other objects of the invention will appear hereinafter.

The foregoing and the related objects now have been accomplished in accordance with the invention by the reaction of dihydropyranyl ethers with ammonia in the presence of a catalyst at an elevated temperature to directly produce pyridine bases, particularly pyridine. The reaction is accomplished by passing a gaseous mixture comprising the dihydropyranyl ether and ammonia with or without an inert diluent gas, such as nitrogen, methane, steam, etc., into contact with a solid dehydrogenation catalyst at a superatmospheric temperature, separating the mixture and the catalyst, and then, ordinarily, recovering the pyridine base or bases thus formed from the resulting mixture, as by distillation, fractional condensation or other suitable method.

The dihydropyranyl ethers which are employed in accordance with the invention are ethers which have directly linked to the ether oxygen atom at least one dihydropyranyl group and wherein the second valency of the ether oxygen atom may be satisfied by union with a second dihydropyranyl group or by union with a monovalent hydrocarbon group, preferably an alkyl group. In accordance with the invention, the essential dihydropyranyl radical which is directly linked to the ether oxygen atom is bonded thereto by a valency of a saturated carbon atom which is directly linked to the heterocyclic oxygen atom in said ring. The carbon-to-carbon unsaturation in the essential dihydropyran ring of the preferred reactants is between two carbon atoms, one of which is directly bonded to the hetero-oxygen atom; however, the invention in its broader application includes the use of dihydropyranyl ethers having the nuclear olefinic bond in a position other than that above specified. The essential character of the dihydropyran ethers which are employed in the process of the invention thus is that the nuclear hetero-oxygen atom of the dihydropyran ring and the extranuclear ether oxygen atom be directly linked to a single saturated carbon atom which is in the dihydropyran ring. It is preferred that the other of the two carbon atoms directly linked to the hetero-oxygen atom be a carbon atom of the olefinic type. Generally, the dihydropyran ethers which are employed according to the invention are referred to as the 2-dihydropyranyl ethers, for the reason that the acyclic ether oxygen atom is directly linked to at least one dihydropyranyl group via a bond to a carbon atom in the No. 2 position thereof. The preferred dihydropyranyl ethers are referred to as the 2-($\Delta^5$-dihydropyranyl) ethers since they have the nuclear olefinic linkage between the carbon atoms in the Nos. 5 and 6 positions of the heterocyclic ring. The dihydropyranyl group may or may not be substituted, depending upon the character of the pyridine base it is desired to prepare. For the preferred process of preparing pyridine, there are employed dihydropyranyl ethers wherein the 2-hydropyranyl group is unsubstituted.

Suitable dihydropyranyl ethers which may be employed in the execution of the process of the present invention as disclosed and claimed in copending application Serial No. 751,980, filed June 2, 1947, now U. S. Patent No. 2,514,168.

It has been found in the practice of the present invention that pyridine can be prepared without appreciable formation of the corresponding compounds having a lesser degree of unsaturation, particularly piperidine. This unexpected result appears to be a general characteristic of the present process based upon the reaction of the dihydropyran ethers with ammonia in the presence of a catalyst. The result thus obtained differs substantially from the results that have been observed in the prior art processes. Because of it, among other reasons, the process of the present invention is advantageous relative to the known methods of synthesizing pyridine bases from oxygen-heterocyclic compounds and ammonia.

The presence of a suitable catalyst appears to be essential for the accomplishment of the desired reaction. In general, the catalysts which can be employed are the catalysts known to those skilled in the art and generally referred to as the solid dehydrogenation catalysts. While a wide variety of solid dehydrogenation catalysts can be used, a particularly suitable type of catalyst comprises one containing one or more oxides of aluminum which are in the adsorptive or activated state, and which may or may not be impregnated with some other substance, e. g., chromium oxide. The activated, i. e., adsorptive aluminas consist mainly of alumina alpha-monohydrate and/or gamma-alumina, and are characterized by their highly active adsorptive properties. These activated aluminas may be prepared from the so-called "gamma" aluminas of the Haber system, which classifies the various forms of alumina into two systems, the "gamma" and the "beta" systems, depending upon their behaviour upon heating. The gamma aluminas of the Haber classification comprise gamma-alumina proper and all of the so-called hydrated aluminas which upon heating are converted into alpha-alumina through the gamma form.

The aluminas which upon heating are converted into alpha-alumina through gamma-alumina and which belong to the "gamma" system of the Haber classification comprise or form the activated or absorptive aluminas and include, for example, the alumina alpha-trihydrate also known as gibbsite or hydrargillite, the alumina beta-trihydrate which is isomorphous with hydrargillite and is also known as bayerite, the alumina alpha-monohydrate known as bohmite, gamma-alumina, gelatinous alumina hydroxide, and bauxite. Alumina catalysts which are characterized by their highly active absorptive properties may be obtained from natural sources or they may be prepared by synthetic means. An efficient catalyst may be prepared by treatment of natural bauxite ore.

Although preferred catalysts thus consist essentially of or at least comprise an activated or adsorptive alumina, other dehydrogenation catalysts may be employed in the process of the invention. While any solid dehydrogenation catalyst may be used, the catalyst preferably is selected from the group comprising the oxides of polyvalent metals, particularly the difficultly reducible oxides, such as those of aluminum, thorium, zirconium, titanium, zinc, silicon, chromium, magnesium, calcium, and barium. Suitable metal sulfides may be employed as the dehydrogenation catalyst, although the oxides are in general preferred.

The catalyst may be a promoted catalyst wherein various substances are added to or incorporated with the solid dehydrogenation catalyst to promote or to enhance its activity. Promoting substances which may be incorporated in or with the catalyst include, for example, alkali salts, such as sodium sulfate, potassium sulfate and the like. The catalyst may be acid treated or caustic treated, if desired. Compound catalysts comprising a solid dehydrogenation catalyst may be employed. Suitable compound catalysts include solid dehydrogenation catalysts comprising or having incorporated therewith or thereon one or a plurality of active metals or metal oxides, such as a base metal dehydrogenating metal or compound of a metal, including nickel, iron, chromium, cobalt, vanadium, tungsten, rubidium, and their suitable oxides, sulfides, and salts of acids comprising one or more heavy metals, e. g., of molybdic acid, vanadic acid, phospho-tungstic acid, etc. A particularly valuable catalyst is one comprising a major proportion of an activated alumina and a minor proportion of chromium oxide.

The catalyst may be employed in any suitable form, as for example, granules, pellets, powders or fragments of regular or irregular contour and of workable size.

The process of the present invention is carried out at a superatmospheric temperature. Although considerable latitude is permissible, the temperature ordinarily will be in excess of about 200° C. and preferably higher than about 300° C. The maximum temperature does not appear to be critical. Temperatures as high as 650° C. may be employed; however, in order to avoid excessive undesired side reactions, maximum temperatures of not over about 500° C. are preferred, the optimum temperature depending upon the catalyst, the dihydropyranyl ether employed, the amounts of the reactants and the like. The relative proportions of the dihydropyranyl ether and the ammonia may be varied within wide limits, although ordinarily the ammonia will be present in molar excess based upon the amount of the dihydropyranyl ether. A suitable range for the relative proportions of the ammonia and dihydropyranyl ether is from about 1:1 molar ratio to about 50:1 molar ratio, a preferred range being from about 1.5:1 to about 10:1. A particularly effective temperature range is from about 300° C. to about 450° C. The pressure may be atmospheric, or superatmospheric, or subatmospheric pressures may be employed. Pressures substantially equal to the atmospheric pressure ordinarily will be the most convenient.

In general, any apparatus suitable for carrying out catalytic vapor phase reactions may be employed. The process may be carried out continuously, intermittently, or batchwise. When operating with a fixed bed of the dehydrogenation catalyst, as is preferred, the apparatus ordinarily will comprise a catalyst-packed reaction tube or chamber equipped with suitable means for maintaining the desired temperature, such as electrical or other heating elements or a surrounding fluid temperature-regulating bath. The dehydropyranyl ether and the ammonia may be separately preheated, mixed in a continuous stream, and passed through the heated reactor in contact with the catalyst. The ammonia may be supplied to the reactor as anhydrous $NH_3$, or it may be furnished in the form of a concentrated aqueous solution. Inert diluents, such as inert gases, may be included in the reactor feed. One or a plurality of catalyst beds may be employed.

The pyridine base or bases produced by the reaction may be recovered from the reactor effluent and/or separated according to any suitable known method, the exact procedure in any given case naturally depending in part upon the identity of the product formed. In general, the gaseous effluent from the reaction zone may be condensed to liquid form, if two phases are formed the phase containing principally product separated, and further treated, as by distillation with or without the aid of entraining, extractive, or other agents added to increase the effectiveness of the distillation of product, to recover the desired pyridine base. Unreacted ammonia and unreacted dihydropyranyl ether, if present in the reactor effluent, may be recovered and recycled. Frequently, because of the selective nature of the reaction, simple fractional distillation of the dried non-aqueous phase of the condensed reactor effluent affords a product of very satisfactory purity. For example, it advantageously has been found possible to recover high quality pyridine in good yield by a single distillation of the condensed products of the reaction of unsubstituted dihydropyranyl ethers with ammonia carried out according to the process of the invention.

The following examples will illustrate certain of the numerous possible specific embodiments of the invention. It will be understood that the examples are intended to be illustrative of the invention and not limitations thereon as it is more broadly disclosed and claimed herein.

*Example I*

For this and the subsequent examples in which there was employed 2($\Delta^5$-dihydropyranyl) methyl ether, the ether was synthesized by heating in a closed vessel under the autogenous pressure an approximately equimolar mixture of acrolein and methyl vinyl ether containing about .003% hydroquinone, at about 190° C. for approximately 2 hours. The 2-($\Delta^5$-dihydropyranyl) methyl ether, distilling at about 127° C. under a pressure of 760 millimeters of mercury, was obtained by fractional distillation of the resulting mixture.

A gaseous mixture of 2-($\Delta^5$-dihydropyranyl) methyl ether and anhydrous ammonia present in a molar ratio of 2.4:1 ($NH_3$:ether) was passed through a heated reaction tube in which there was disposed a solid dehydrogenation catalyst consisting of granular activated alumina having a particle size of 8 to 14 mesh and a surface area of approximately 200 square meters per gram. The activated alumina contained approximately 0.03% moisture and, as promoter, about 0.03% by weight of sodium in the form of sodium sulfate introduced by soaking the catalyst in a dilute aqueous solution of sodium sulfate and drying. The mixture of 2-($\Delta^5$-dihydropyranyl) methyl ether and ammonia was passed over the catalyst at a temperature of 400° C. at a rate of 1 milliliter of 2-($\Delta^5$-dihydropyranyl) methyl ether (measured in liquid state) per 100 cc. of catalyst per minute. The effluent from the reaction tube was condensed in a water-cooled condenser. The condensed product consisted of two layers, one an upper light yellow layer and the other a lower dark-colored layer. The upper layer was separated and fractionally distilled. From 70 grams of the distilland the following fractions were collected:

A. 3 grams distilling from 40° to 74° C.
B. 5 grams distilling from 78° to 84° C.
C. 33 grams distilling from 86° to 96° C.
D. 23 grams residue.

Fraction C, a pyridine-water azeotrope, was dried by contacting with solid sodium hydroxide. The pyridine which separated was redistilled at 112° C. to 113° C. In order to test the purity of the pyridine thus prepared, the picrate was prepared and its melting point compared with that of an authentic sample of highly purified pyridine picrate. The two melting points were the same and there was no depression in the melting point of a mixture of the two samples.

Fraction D from the above distillation was combined with the original lower layer of the condensed reactor effluent and the mixture was dried over solid sodium hydroxide and distilled. The following fractions were collected:

1. 9 grams distilling between 69° and 100° C.
2. 17 grams distilling between 110° and 120° C.
3. 14 grams distilling between 122° and 130° C.
4. 36 grams of higher boiling products and residue.

Fraction 2 represents a further recovery of pyridine product. Fraction 3 was composed predominantly of unreacted 2-($\Delta^5$-dihydropyranyl) methyl ether. The absence of material distilling between 100° and 110° shows that no appreciable amount of piperidine, which has a boiling point of 105.8° C., was formed.

*Example II*

A gaseous mixture of 2-($\Delta^5$-dihydropyranyl) methyl ether and ammonia introduced as aqueous ammonium hydroxide (d.=0.9) was passed over the catalyst employed in the preceding example at a temperature of 400° C., a flow rate of 1 milliliter of liquid 2-($\Delta^5$-dihydropyranyl) methyl ether per 100 cc. of catalyst per minute, and a reactant ratio of 2.3:1 ($NH_3$:ether). The liquid product was dried over solid sodium hydroxide and fractionally distilled. From 119 grams of dried condensate there were obtained: light ends distilling below 110° C., 32 grams; pyridine cut distilling between 110° and 120° C., 23 grams; 2-(Δ⁵-dihydropyranyl) methyl ether cut distilling between 120° and 130° C., 10 grams.

*Example III*

In this experiment there was employed as the catalyst a chromium on activated alumina catalyst containing about 10% of chromium and having a particle size of 8 to 14 mesh. A gaseous mixture of 2-(Δ⁵-dihydropyranyl) methyl ether and anhydrous ammonia present in mole ratio of 4.3:1 (NH₃:ether) was passed over the catalyst at 300° C. at a flow rate of about 1 milliliter of liquid 2-(Δ⁵-dihydropyranyl) methyl ether per 100 cc. of catalyst per minute. From 108 grams of dried condensed reactor effluent there was obtained 24.5 grams of pyridine. When the experiment was repeated under conditions the same except for a temperature of 350° C. instead of 300° C. an even higher yield of pyridine was obtained.

Although in the foregoing examples 2-(Δ⁵-dihydropyranyl) methyl ether was employed as the dihydropyranyl ether, other dihydropyranyl ethers can be employed with comparable results. For the preparation of pyridine, the dihydropyran ether that is used contains no substituents on the dihydropyran ring. Higher pyridine bases may be prepared in a similar manner by using in the process of the invention suitable substituted dihydropyranyl ethers; for example, picolines may be prepared from methyl-2-dihydropyranyl ethers while collidines may be prepared correspondingly from dimethyl-2-dihydropyranyl ethers. Pyridine bases which may be prepared according to the process of the invention include, in addition to pyridine and picolines, higher pyridine bases such as the lutidines, the collidines, aldehydine, conyrnine, parvalines, parvolines, the ethyl collidines, rubidine, viridine, and their homologs and analogs. In general, the dihydropyranyl ethers which may be employed in accordance with the generic invention include those corresponding to the formula

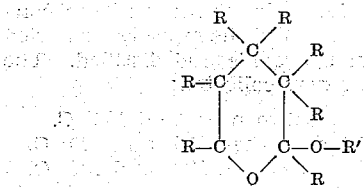

in which each R represents a radical selected from the class consisting of the hydrogen atom and the hydrocarbon radicals and in which the several radicals denoted by R may be the same or different. Because of their availability or else the ease with which they may be synthesized and because of the preferred character and particular value of the pyridine bases synthesized therefrom, the most desirable dihydropyran ethers are those represented by the foregoing formula when each R represents either the hydrogen atom or an alkyl group, preferably a lower alkyl group. Because of their greater availability and the value of the pyridine bases derived therefrom according to the process of the invention, dihydropyranyl ethers which are most desirably employed have alkyl substituent groups at one or more of positions Nos. 4, 5 and 6 of the dihydropyran ring (the ether oxygen atom being linked to the carbon atom in position No. 2 of the ring) and are otherwise unsubstituted.

The nature of the second radical linked to the ether oxygen atom is not known to be critical. Ordinarily, for preparative reasons, it will be a lower alkyl group such as methyl, ethyl, propyl, isopropyl, a butyl group, a pentyl group, or the like. Both radicals linked to the acyclic ether oxygen atom may be 2-dihydropyranyl groups, which may be substituted, preferably in such a manner that the ether is symmetrical about the acyclic ether oxygen atom. In this case, both of the dihydropyranyl radicals attached to the ether oxygen atom are thought to take part in the reaction whereby pyridine bases are formed, two molecules of the pyridine base per molecule of such bis-dihydropyranyl ethers being formed. In other cases, the radical which satisfies the second valency of the ether oxygen atom does not appear to enter into the reaction by which the desired product is formed. Accordingly, instead of the preferred dihydropyran alkyl ethers there may be employed dihydropyran ethers in which the second valency of the ether oxygen atom is satisfied by attachment to a wide variety of radicals, such as alkyl, aryl, alkaryl, aralkyl and olefinic radicals.

Representative unsubstituted dihydropyran ethers which may be employed in accordance with the process of the invention include the preferred compounds 2-(Δ⁵-dihydropyranyl) methyl ether, 2-(Δ⁵-dihydropyranyl) ethyl ether, 2-(Δ⁵-dihydropyranyl) propyl ether, 2-(Δ⁵-dihydropyranyl) butyl ether, as well as the less preferred ethers, such as 2-(Δ⁵-dihydropyranyl) phenyl ether, 2-(Δ⁵-dihydropyranyl) cyclohexyl ether, 2-(Δ⁵-dihydropyranyl) benzyl ether and 2-(Δ⁵-dihydropyranyl) allyl ether. Representative substituted or alkylated dihydropyran ethers which may be employed for the preparation of pyridine bases include, for example, the monomethyldihydropyran ethers, such as 2-(4-methyl-Δ⁵-dihydropyranyl) ethyl ether, 2-(5-methyl-Δ⁵-dihydropyranyl) isobutyl ether, 2-(6-methyl-Δ⁵-dihydropyranyl) propyl ether; the dimethyldihydropyran ethers, such as 2-(4,5-dimethyl-Δ⁵-dihydropyranyl) methyl ether and 2-(5,6-dimethyl-Δ⁵-dihydropyranyl) methyl ether, and more highly alkylated dihydropyran ethers as well as alkylated dihydropyran ethers containing higher alkyl groups, such as 2-(4,5,6-trimethyl-Δ⁵-dihydropyranyl) isobutyl ether, 2-(5-ethyl-6-methyl-Δ⁵-dihydropyranyl) isopropyl ether, 2-(4-pentyl-Δ⁵-dihydropyranyl) methyl ether, 2-(4-cyclohexyl-Δ⁵-dihydropyranyl) vinyl ether, 2-(5-octyl-Δ⁵-dihydropyranyl) phenyl ether, 2-(4,5-dihexyl-Δ⁵-dihydropyranyl) isobutyl ether, 2-(5-decyl-Δ⁵-dihydropyranyl) octyl ether and homologs and analogs thereof.

We claim as our invention:

1. A process for the direct synthesis of pyridine, which comprises passing a gaseous mixture comprising 2-(Δ⁵-dihydropyranyl) methyl ether and ammonia into contact with a solid catalyst comprising activated alumina at a temperature within the range of from about 300° C. to about 540° C.

2. A process for the direct synthesis of pyridine, which comprises passing a gaseous mixture comprising a 2-(Δ⁵-dihydropyranyl) alkyl ether and ammonia into contact with a solid catalyst comprising activated alumina at a temperature within the range of from about 300° C. to about 450° C.

3. A process for the direct synthesis of pyridine, which comprises passing a gaseous mixture comprising a 2-($\Delta^5$-dihydropyranyl) alkyl ether into contact with a solid catalyst comprising activated alumina.

4. A process for the direct synthesis of pyridine, which comprises passing a gaseous mixture comprising a 2-($\Delta^5$-dihydropyranyl) alkyl ether and ammonia into contact with a solid dehydrogenation catalyst.

5. A process for the direct synthesis of an alkylated pyridine base, which comprises passing a gaseous mixture comprising an alkylated 2-($\Delta^5$-dihydropyranyl) ether having an alkyl group directly linked to a carbon atom of the dihydropyran ring and ammonia into contact with a solid catalyst comprising activated alumina at a temperature within the range of from about 300° C. to about 450° C.

6. A process for the direct synthesis of an alkylated pyridine base, which comprises passing a gaseous mixture comprising an alkylated 2-($\Delta^5$-dihydropyranyl) ether having an alkyl group directly linked to a carbon atom of the dihydropyran ring and ammonia into contact with a solid dehydrogenation catalyst at a temperature within the range of from about 300° C. to about 600° C.

7. A process for the direct synthesis of a pyridine base, which comprises passing a gaseous mixture comprising a 2-($\Delta^5$-dihydropyranyl) ether and ammonia into contact with a solid catalyst comprising activated alumina at a temperature within the range of from about 300° C. to about 450° C.

8. A process for synthesizing pyridine which comprises the reaction of a 2-($\Delta^5$-dihydropyranyl) alkyl ether wherein the alkoxy group is the sole substituent on the dihydropyran ring with ammonia in the presence of a solid dehydrogenation catalyst to produce said pyridine.

9. A process for synthesizing a pyridine base which comprises the reaction of a 2-($\Delta^5$-dihydropyranyl) ether with ammonia to produce said pyridine base.

10. A process for the direct synthesis of a pyridine base, which comprises passing a gaseous mixture comprising a 2-($\Delta^5$-dihydropyranyl) ether and ammonia into contact with a solid catalyst comprising activated alumina.

11. A process for the direct synthesis of a pyridine base, which comprises passing a gaseous mixture comprising a 2-($\Delta^5$-dihydropyranyl) ether and ammonia into contact with a solid dehydrogenation catalyst.

12. A process for the direct synthesis of a pyridine base, which comprises passing a gaseous mixture comprising a 2-($\Delta^5$-dihydropyranyl) ether and ammonia into contact with a solid dehydrogenation catalyst at a temperature within the range of from about 250° C. to about 650° C.

CURTIS W. SMITH.
SEAVER A. BALLARD.

No references cited.

Certificate of Correction

Patent No. 2,528,978                                          November 7, 1950

CURTIS W. SMITH ET AL.

It is hereby certified that error appears in the printed specification of the above numbered patent requiring correction as follows:

Column 7, lines 51 to 54, for that portion of the formula reading $$\begin{matrix} R-C \\ | \\ R-C \end{matrix} \quad \text{read} \quad \begin{matrix} R-C \\ \| \\ R-C \end{matrix}$$

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*